US00RE50185E

(19) United States
(12) Reissued Patent
Hooli et al.

(10) Patent Number: US RE50,185 E
(45) Date of Reissued Patent: Oct. 22, 2024

(54) ALLOCATION OF PREAMBLE SEQUENCES

(71) Applicant: NOKIA SOLUTIONS AND NETWORKS OY, Espoo (FI)

(72) Inventors: Kari Juhani Hooli, Oulu (FI); Juha Korhonen, Espoo (FI)

(73) Assignee: NOKIA SOLUTIONS AND NETWORKS OY, Espoo (FI)

(21) Appl. No.: 17/484,778

(22) Filed: Sep. 24, 2021

Related U.S. Patent Documents

Reissue of:
(64) Patent No.: 8,451,787
Issued: May 28, 2013
Appl. No.: 12/680,930
PCT Filed: Jun. 5, 2008
PCT No.: PCT/EP2008/056979
§ 371 (c)(1),
(2) Date: Apr. 15, 2010
PCT Pub. No.: WO2009/043610
PCT Pub. Date: Apr. 9, 2009

(30) Foreign Application Priority Data

Sep. 2, 2007 (EP) ..... 07117750

(51) Int. Cl.
*H04W 72/04* (2023.01)
*H04J 13/14* (2011.01)
*H04L 5/00* (2006.01)
*H04J 13/00* (2011.01)

(52) U.S. Cl.
CPC ..... *H04L 5/0053* (2013.01); *H04J 13/14* (2013.01); *H04J 13/0062* (2013.01); *H04L 5/0037* (2013.01)

(58) Field of Classification Search
CPC ..... H04L 5/0053; H04L 5/0037; H04J 13/14; H04J 13/0062; H04W 72/04; H04W 74/0833
See application file for complete search history.

(56) References Cited

U.S. PATENT DOCUMENTS 6,377,618 B1 4/2002 Prasad et al. ..... 375/225
6,434,147 B1 8/2002 Brown et al.
7,599,327 B2 10/2009 Zhuang
(Continued)

FOREIGN PATENT DOCUMENTS

CN 101090281 A 12/2007
EP 1 971 097 A2 9/2008
(Continued)

OTHER PUBLICATIONS

"3rd Generation Partnership Project; Technical Specification Group Geran; Digital cellular telecommunications system (Phase 2+); Multiplexing and multiple access on the radio path (Release 4)", 3GPP TS 45.002 v4.0.0, (Sep. 2000), 78 pages.
(Continued)

*Primary Examiner* — Ovidio Escalante
(74) *Attorney, Agent, or Firm* — ALSTON & BIRD LLP

(57) ABSTRACT

A set of specific sequences including a set of root sequences and cyclic shifts thereof is searched, wherein it is started from a root sequence index indicating a root sequence of ordered root sequences, available cyclic shifts of the root sequence are included, and it is continued with a next root sequence if necessary for filling the set, interpreting the ordered root sequences in a cyclic manner.

149 Claims, 7 Drawing Sheets

(56) References Cited

U.S. PATENT DOCUMENTS

| | | | | |
|---|---|---|---|---|
| 7,881,398 | B2 | 2/2011 | Mujtaba | |
| 7,957,759 | B2 | 6/2011 | Papasakellariou | |
| 8,085,724 | B2 | 12/2011 | Imamura et al. | |
| 8,094,554 | B2 | 1/2012 | Gholmieh et al. | |
| 8,189,455 | B1 | 5/2012 | Ma et al. | |
| 8,199,706 | B2 | 6/2012 | Bertrand et al. | |
| 8,234,325 | B2 | 7/2012 | Lee et al. | |
| 8,295,229 | B2 | 10/2012 | Vujcic | |
| 8,441,991 | B2 | 5/2013 | Papasakellariou et al. | |
| 8,654,624 | B2 | 2/2014 | Hao et al. | |
| 8,773,968 | B2 | 7/2014 | Jiang et al. | |
| 2004/0022237 | A1 | 2/2004 | Elliott et al. | |
| 2004/0165650 | A1 | 8/2004 | Miyazaki et al. | |
| 2005/0208950 | A1 | 9/2005 | Hasse | |
| 2007/0139267 | A1 | 6/2007 | Black et al. | |
| 2007/0171849 | A1 | 7/2007 | Zhang et al. | |
| 2007/0211762 | A1 | 9/2007 | Song et al. | 370/490 |
| 2007/0217362 | A1 | 9/2007 | Kashima et al. | 370/330 |
| 2007/0230600 | A1* | 10/2007 | Bertrand et al. | 375/260 |
| 2007/0253465 | A1 | 11/2007 | Muharemovic et al. | |
| 2008/0075184 | A1* | 3/2008 | Muharemovic et al. | 375/260 |
| 2008/0235314 | A1* | 9/2008 | Lee et al. | 708/426 |
| 2008/0299984 | A1 | 12/2008 | Shimomura et al. | |
| 2008/0316959 | A1 | 12/2008 | Bachl et al. | |
| 2009/0046629 | A1* | 2/2009 | Jiang | H04J 13/0059 370/328 |
| 2010/0034165 | A1* | 2/2010 | Han | H04L 1/1614 370/330 |

FOREIGN PATENT DOCUMENTS

| | | | |
|---|---|---|---|
| EP | 2187662 | A1 | 5/2010 |
| EP | 2 045 939 | B1 | 12/2015 |
| EP | 2 981 103 | A1 | 2/2016 |
| EP | 3 220 562 | B1 | 9/2017 |
| JP | 2004253899 | A | 9/2004 |
| KR | 20080084536 | A | 9/2008 |
| WO | WO 2009/043610 | A1 | 4/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.7.0, (Feb. 2013), 101 pages.

"3rd Generation Partnership Project; Technical Specification Group Radio Access Network; Evolved Universal Terrestrial Radio Access (E-UTRA); Physical channels and modulation (Release 11)", 3GPP TS 36.211 v11.4.0, (Sep. 2013), 120 pages.

"3rd Generation Partnership Project; Technical Specification Group Radio Access Network; Evolved Universal Terrestrial Radio Access (E-UTRA); Physical channels and modulation (Release 8)", 3GPP TS 36.211 v8.0.0, (Sep. 2007), 50 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211 v8.1.0, (Nov. 2007), 54 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211 v8.6.0, (Mar. 2009), 83 pages.

"3rd Generation Partnership Project; Technical Specification Group Radio Access Network; Evolved Universal Terrestrial Radio Access (E-UTRA); Physical Channels and Modulation (Release 8)", 3GPP TS 36.211 v8.9.0, (Dec. 2009), 83 pages.

"3rd Generation Partnership Project; Technical Specification Group Radio Access Network; Evolved Universal Terrestrial Radio Access (E-UTRA); Physical Channels and Modulation (Release 9)", 3GPP TS 36.211 v9.1.0, (Mar. 2010), 85 pages.

"About 3GPP—Third Generation Partnership Project", [online] [Retrieved May 15, 2017] Retrieved via the Wayback Machine: <URL: http://web.archive.org/web/20070703092005/http://www.3gpp.org:80/About/about.htm>, (Jul. 3, 2007), 1 page.

"Delegates Corner—All the Help a 3GPP Delegate Needs", [online] [Retrieved May 15, 2017] Retrieved via the Wayback Machine: <URL: http://web.archive.org/web/20070702235036/http://www.3gpp.org:80/delegates/delegates.htm>, (Jul. 2, 2007), 2 pages.

"Digital Cellular Telecommunications System (Phase 2+); Multiplexing and Multiple Access on the Radio Path", GSM Technical Specification, GSM 05.02, European Telecommunications Standards Institute, (May 1996), 38 pages.

"Frequently Asked Questions concerning 3GPP", [online] [Retrieved May 15, 2017] Retrieved via the Wayback Machine: <URL: http://web.archive.org/web/20070630180057/http://www.3gpp.org:80/faq/faq_2005_2.htm>, (Jun. 30, 2007), 11 pages.

"SC-FDMA Single Carrier FDMA in LTE", IXIA, (Nov. 2009), 16 pages.

"Transmission Control Protocol", Darpa Internet Program Protocol Specification, Information Sciences Institute, RFC 793, (Sep. 1981), 91 pages.

3GPP Support, "Draft (v02) Minutes of the 39th 3GPP TSG RAN Meeting", RP-080237, (Mar. 4-7, 2008), 111 pages.

3GPP TSG RAN WGI Meeting #50 R1-073836 Panasonic, NTT DoCoMo Athens, Greece, Aug. 20-24, 2007 Title: RACH sequence allocation and indication to the cell, 10 pages.

Baker, M., "LTE-Advanced Physical Layer", IMT-Advanced Evaluation Workshop, REV-090003r1, (Dec. 17-18, 2009), 48 pages.

Certified English Translation of U.S. Appl. No. 60/976,125, filed Sep. 28, 2007; In re: Lee et al., entitled "Index Mapping and Signaling Method", 68 pages.

Claim Construction Memorandum and Order, File No. 2:16-cv-0755-JRG-RSP, *Nokia Solutions and Networks US LLC and Nokia Solutions and Networks Oy* v. *Huawei Technologies Co, Ltd and Huawei Device USA, Inc.*, (May 24, 2017), 30 pages.

Complaint, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (Jul. 13, 2016), 21 pages.

Daimler's Notice of Opposition for European Application No. 17163537.8, Patent No. EP 3 220 562 dated Jan. 31, 2020, 69 pages, w rough machine translation.

Decision Granting Joint Motion to Dismiss, *Huawei Technologies Co. Ltd* v. *Nokia Solutions and Networks Oy*, Case IPR2017-01545 (Jan. 9, 2018), 3 pages.

Decision Rejecting the Opposition for European Application No. 17163537.8 dated Jun. 28, 2021, 18 pages.

Declaration of Dr. Bijan Jabbari, Ph.D., Huawei Exhibit 1003, (Jun. 8, 2017), 117 pages.

Declaration of J. Nicholas Laneman, File No. 2:16-cv-00755-JRG-RSP, (Mar. 28, 2017), 43 pages.

Declaration of Ms. Xiaoan Fan, Huawei Exhibit 1020, (Jun. 10, 2017), 145 pages.

Defendant's Technology Tutorial, File No. 2:16-cv-755, *Nokia Solutions et al.*, vs. *Huawei Technologies Co. Ltd*, (Mar. 14, 2017), 95 pages.

Deposition of Juha Korhonen, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (Jun. 30, 2017), 66 pages.

Deposition of Mr. Kari Hooli, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (May 31, 2017), 90 pages.

Ericsson, "Alignment of 36.201 with Other LTE L1 Specifications", 3GPP TSG-RAN WG1 #51, 36.201 CR 1, R1-075115, (Nov. 5-9, 2007), 9 pages.

Ericsson, "Introduction of Optimized FS2 for TDD", 3GPP TSG-RAN WG #51, 36.211 CR 1, R1-075049, (Nov. 5-9, 2007), 43 pages.

Ericsson, "Introduction of Scrambling Sequences, Uplink Reference Signal Sequences, Secondary Synchronization Sequences and Control Channel Processing", 3GPP TSG-RAN WG #51, 36.211 CR 0002, R1-075112, (Nov. 5-9, 2007), 54 pages.

(56) References Cited

OTHER PUBLICATIONS

Extended European Search Report for European Application No. 07117750.5 dated Jun. 30, 2008, 9 pages.
Extended European Search Report for European Application No. 11187489.7 dated Jun. 28, 2012, 6 pages.
Extended European Search Report for European Application No. 15181110.6 dated Jan. 8, 2016, 5 pages.
Extended European Search Report for European Application No. 17163537.8 dated Jun. 29, 2017, 7 pages.
Extended European Search Report for European Application No. 19163746.1 dated Jun. 7, 2019, 7 pages.
Garcia-Alis et al., "Introduction to LTE", Steepest Ascent, (Jan. 5, 2012), 70 pages, available at http://www.steepestascent.com/content/mediaassets/pdf/presentations/SA_Introduction_to_LTE.pdf (Secured PDF not available for upload).
Hontzeas, A., "Long Term Evolution (LTE) Handbook", Lulu.com, (Nov. 2013), 45 pages.
Huawei's Invalidity Contentions, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (Oct. 25, 2016), 140 pages.
Huawei's Responsive Claim Construction Brief, File No. 2:16-cv-00755, *Nokia Solutions and Networks US LLC and Nokia Solutions and Networks Oy* v. *Huawei Technologies Co. Ltd. And Huawei Device USA, Inc.*, (Mar. 28, 2017), 22 pages.
International Preliminary Report on Patentability for Patent Cooperation Treaty Application No. PCT/EP2008/056979 dated Apr. 7, 2010, 10 pages.
Ku, G., "Resource Allocation in LTE", Adaptive signal Processing and Information Theory Research Group, Drexel University, (Nov. 11, 2011), 33 pages.
Letter Regarding the Opposition Procedure for European Application No. 17163537.8 dated Feb. 26, 2021, 66 pages with English machine translation.
Markman Hearing, File No. 2:16-cv-00755-JRG-RSP, *Nokia Solutions and Network US, LLC, et al.*, vs. *Huawei Technologies Co., Ltd*, (May 3, 2017), 50 pages.
MCC Support, "Draft Report of 3GPP TSG RAN WG1 #51 v1.0.0", 3GPP TSG RAN WG1 Meeting #51b, R1-080002, (Jan. 14-18, 2008), 69 pages.
MCC Support, "Report of 3GPP TSG RAN WG1 #50b v1.0.0", 3GPP TSG RAN WG1 Meeting #51, R1-075054, (Nov. 5-11, 2007), 62 pages.
Minutes of the Oral Proceedings for European Application No. 17163537.8 dated Jun. 28, 2021, 8 pages.
Motorola, "Slight Modification to E-UTRA RACH CP Samples for Extended and Repeated Preamble Formats", 3GPP TSG RAN WG1 #51, R1-075042, (Nov. 5-9, 2007), 1 page.
Motorola, "Update of 36.213", 3GPP TSG-RAN WG1 Meeting #51, 36.213 CR 1, R1-075116, (Nov. 5-9, 2007), 13 pages.
Nokia et al., "On Construction and Signaling of RACH Preambles", 3GPP TSG RAN WG1 #48bis, R1-071661, (Mar. 26-30, 2007), 2 pages.
Nokia Solutions and Networks US LLC and Nokia Solutions and Networks Oy's Opening Claim Construction Brief, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (Mar. 14, 2017), 33 pages.
Nokia Solutions and Networks US LLC and Nokia Solutions and Networks Oy's Reply Claim Construction Brief, File No. 2:16-cv-00755-JRG-RSP, *Nokia Solutions and Networks US LLC and Nokia Solutions and Networks Oy* v. *Huawei Technologies Co, Ltd and Huawei Device USA, Inc.*, (Apr. 4, 2017), 16 pages.
Nokia, "Restricted Sets of RACH Preamble Signatures for Environments with High Doppler Shifts", 3GPP TSG RAN WG1 #47bis, R1-070377, (Jan. 15-19, 2007), 6 pages.
Nokia, "RRC State Correction for LTE UE Measurements", 3GPP TSG RAN WG1 Meeting #51, 36.214 CR 001, R1-075104, (Nov. 5-9, 2007), 4 pages.
Nokia's Response to the Notice of Opposition for European Application No. 17163537.8 dated Jun. 24, 2020, 30 pages., with machine English translation.
Non-Final Office Action for U.S. Appl. No. 12/680,930 dated Aug. 3, 2012.
Notice of Allowance for U.S. Appl. No. 12/680,930 dated Jan. 25, 2013.
Notice of Filing Date Accorded to Petition and Time for Filing Patent Owner Preliminary Response, Case IPR2017-01545, *Huawei Technologies Co. Ltd.* V. *Nokia Solutions and Networks Oy*, (Jul. 18, 2017), 5 pages.
Office Action for European Application No. 07117750.5 dated Feb. 16, 2015, 4 pages.
Office Action for European Application No. 07117750.5 dated Jun. 27, 2012, 5 pages.
Office Action for European Application No. 07117750.5 dated Oct. 23, 2009, 4 pages.
Office Action for European Application No. 07117750.5 dated Sep. 19, 2014, 5 pages.
Office Action for European Application No. 11187489.7 dated Feb. 16, 2016, 4 pages.
Office Action for European Application No. 11187489.7 dated Sep. 19, 2014, 4 pages.
Panasonic et al., "RACH Sequence Allocation and Indication to the Cell", 3GPP TSG RAN WG1 Meeting #49bis, R1-072800, (Jun. 25-29, 2007), 9 pages.
Patent Owner Preliminary Response, *Huawei Technologies Co. Ltd* v. *Nokia Solutions and Networks Oy*, Case IPR2017-01545, (Oct. 18, 2017), 61 pages.
Petition for Inter Partes Review of U.S. Pat. No. 8,451,787 Pursuant to 35 U.S.C. §§ 311-319, 37 C.F.R. § 42, Trial No. IPR2017-01545, (June 1,2 2017), 80 pages.
Preliminary Opinion of the Opposition Division, File No. 5 Ni 24/19 (EP), (Sep. 30, 2020), 6 pages.
Qualcomm Europe, "Update of 36.212", 3GPP TSG-RAN WG1 #51, 36.212 CR 001, R1-075111, (Nov. 5-9, 2007), 36 pages.
Response to Judicial Court Notice According to § 83, Paragraph 1, Invalidity Proceedings against the German Part DE 60 2007 050 997.1 of the European Patent EP 2 981 103, File No. 5 Ni 24/19 (EP), (May 17, 2021), 13 pages.
Result of Phone Consultation for European Application No. 11187489.7 dated Feb. 10, 2015, 4 pages.
Sesia et al., "LTE—The UMTS Long Term Evolution: From Theory to Practice", John Wiley & Sons, Ltd., (Aug. 2011), 794 pages.
Spencer et al., "An Introduction to the Multi-User MIMO Downlink", IEEE Communications Magazine, vol. 42, Issue 10, (Oct. 2004), 8 pages.
Submission in Response to Preliminary Opinion of the Opposition Division for European Application No. 17163537.8 dated Feb. 26, 2021, 3 pages.
Summons to Attend Oral Proceedings for European Application No. 17163537.8 dated Sep. 30, 2020, 28 pages.
Texas Instruments "Interference Between Sounding Reference Signal and Random Access Preamble", 3GPP TSG RAN WG1 #51, R1-074676, (Nov. 5-9, 2007), 3 pages.
Texas Instruments et al., "PRACH High-Speed Ncs Values", 3GPP TSG RAN WG1 #51, R1-075058, (Nov. 5-9, 2007), 6 pages.
Texas Instruments et al., "Way Forward Proposal on PRACH Sequence Ordering", 3GPP TSG RAN WG1 #50bis, R1-074514, (Oct. 8-12, 2007), 3 pages.
Texas Instruments, "Random Access Preamble L1 Parameters in E-UTRA", 3GPP TSG RAN WG1 #49bis, R1-072838, (Jun. 25-29, 2007), 5 pages.
Watanabe et al., "Outdoor LTE Infrastructure Equipment (eNodeB)", Fujitsu Scientific & Technical Journal, vol. 48, No. 1, (Jan. 2012), pp. 27-32.
ZTE et al., "Correction on PRACH Sequence Ordering Table", 3GPP TSG RAN WG1 Meeting #52, R1-081044, (Feb. 11-15, 2008), 5 pages.
Extended European Search Report for European Application No. 23184895.3 dated Oct. 30, 2023, 8 pages.
Notice of Opposition for European Application No. 20201661.4 dated Jun. 20, 2024, 1 page.

(56) References Cited

OTHER PUBLICATIONS

Panasonic et al., "RACH sequence allocation and indication to the cell", 3GPP Tsg Ran WG1 Meeting #50, R1-073622, (Aug. 20-24, 2007), 9 pages.
3GPP TSG RAN1#46, R1-062066, Tallinn, Estonia, Aug. 28-Sep. 1, 2006, "Preamble Sequence Design for Non-Synchronized Random Access", 4 pgs.
TSG-RAN WG1 Meeting #47bis, R1-070189. Sorrento, Italy, Jan. 15-19, 2007, "Zadoff-Chu sequence allocation on RACH for complexity reduction", 4 pgs.
EP Search Report for EP Patent Application No. 07117750.5 mailed Jun. 27, 2012.
RU Office Action for RU Patent Application No. 2010117380/07(024743) mailed Apr. 25, 2012.
CN Office Action for CN patent Application No. 2010-527370 mailed May 31, 2012.
Group-based Re-ordering of ZC sequences in RACH, 3GPP TSG RAN WG1 #50 meeting, R1-073595, XP 50107194 , 8 pages.
Preamble index mapping for non-synchronized RACH, 3GPP TSG RAN WG1 meeting #50, R1-073501, XP 50107107, 4 pages.
3GPP TSG RAN WG1 Meeting #50bis, R1-074340, "Sequence ordering and other RACH issues", Shanghai, China, Oct. 2007, 5 pages.
3GPP TSG RAN WG1 #50bis R1-074148, "Cyclic Shift Configuration and Sequence Ordering in Support of High-Speed Random Access", Shanghai, China, Oct. 2007, 6 pages.
3GPP TSG RAN WG1 Meeting #50bis, R1-074421, "PRACH sequence index ordering", Shanghai, China, Oct. 2007, 5 pages.
3GPP TSG RAN WG1 Meeting #50 R1-073836 Panasonic, NTT DoCoMo Athens, Greece, Aug. 20-24, 2007 Title: RACH sequence allocation and indication to the cell, 10 pages.

* cited by examiner

ALLOCATION OF PREAMBLE SEQUENCES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to allocation of preamble sequences for an access procedure in a mobile communication system. In particular, the invention relates to allocation of preamble sequences for a random access in E-UTRAN (Evolved UMTS (Universal Mobile Telecommunications System) Terrestrial Radio Access Network).

BACKGROUND OF THE INVENTION

The random access procedure of E-UTRAN resembles that of WCDMA (Wideband Code Division Multiple Access). In both systems, in a first step a user equipment (UE) transmits a preamble on an access slot. A number of different preamble sequences have been defined for the UE to select for the preamble transmission. For E-UTRAN, so called Zadoff-Chu sequences have been chosen. The length of a sequence is 839 samples, which means that 838 root sequences are available. Depending on the cell range which defines delay uncertainty, up to 64 cyclically shifted sequences are obtained from a root sequence.

In E-UTRAN FDD (Frequency Division Duplex) system, 64 preamble sequences are allocated for each cell. In order to minimize system information, only a root sequence index u0 and a cyclic shift increment Ncs and a mobility parameter are broadcasted for UEs of a cell. The UEs form a complete set of 64 sequences by determining available cyclic shifts of the sequence u0 and continuing from the consecutive root sequences until the 64 sequences are collected.

This selected sequence allocation system means that it is required to define an order of the root sequences. The ordering should be decided taking into account two issues.

The first issue is that the cubic metric (CM) of the sequences varies depending on the root sequence index. CM is important because it defines the power back-off that is needed for reaching a certain level of adjacent channel interference when a typical nonlinear transmitter of a UE is assumed. When CM is high, UE cannot transmit with as high mean power as in case of low CM. This means that the coverage (i.e. the supportable cell radius) varies depending on the root sequence. Then it would be preferable to order the root sequences according to CM so that the consecutive root sequences (that are allocated to the same cell) would support roughly the same cell size.

The second issue to consider is that a so called sequence restriction scheme may completely deny utilization of a root sequence or at least some of its cyclic shifts. The restriction scheme is needed because of the special properties of the Zadoff-Chu sequences in case of large frequency offsets, and the scheme will be applied in cells where UEs can move with high speeds. In the following, such cells are called high mobility cells, and the other cells, where restrictions are not applied, are called low mobility cells. A mobility parameter of the System Information indicates if the restrictions are in use. The restrictions define a maximum supportable cell size for each root sequence. If the sequences are ordered according to the maximum supportable size of a high mobility cell, the reuse of the sequences can be optimized in presence of both high and low mobility cells: Those root sequences that are not available in high mobility cells of a certain size form a set of consecutive sequences that can be effectively allocated for low mobility cells.

The two ordering systems, according to CM and according to the maximum size of high mobility cell, are contradicting: sequences with nearly equal CM may support completely different sizes of high mobility cell.

SUMMARY OF THE INVENTION

The present invention aims at enabling a more flexible sequence allocation where both criteria of sequence ordering are taken into account.

According to the invention, this is achieved by devices and methods as set out in the appended claims. The invention can also be implemented as computer program product.

According to an exemplary embodiment of the invention, sequence allocation in cyclic manner is proposed. This enables a more flexible sequence allocation which—depending on the sequence ordering and allocation scheme—may lead to a larger reuse factor, i.e. an additional set of preambles for allocation in the network.

In addition, UE implementation is simplified since an error case that UE needs a sequence consecutive to 838 is eliminated.

According to another exemplary embodiment of the invention, a root sequence ordering scheme is proposed that includes the steps: (1) dividing sequences in two groups according to CM, (2) segmenting the sequences in both of the groups according to the supported size of high mobility cells or segmenting only the high CM group according to supported size of high mobility cells, and (3) ordering the sequences in the segments according to CM. This ordering scheme allows simple and effective allocation as those low CM sequences that provide equal and maximal radio coverage can be allocated over a continuous set of sequences. On the other hand, allocation of high CM sequences can be done taking into account the differences of the radio coverage of the sequences.

For the purpose of the present invention to be described herein below, it should be noted that

- a device may for example be any device by means of which a user may access a communication network; this implies mobile as well as non-mobile devices and networks, independent of the technology platform on which they are based; only as an example, it is noted that terminals operated according to principles standardized by the 3rd Generation Partnership Project 3GPP and known for example as UMTS terminals are particularly suitable for being used in connection with the present invention;
- a device can act as a client entity or as a server entity in terms of the present invention, or may even have both functionalities integrated therein;
- method steps likely to be implemented as software code portions and being run using a processor at one of the server/client entities are software code independent and can be specified using any known or future developed programming language;
- method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

DESCRIPTION OF THE EMBODIMENTS OF THE INVENTION

Figure 1:
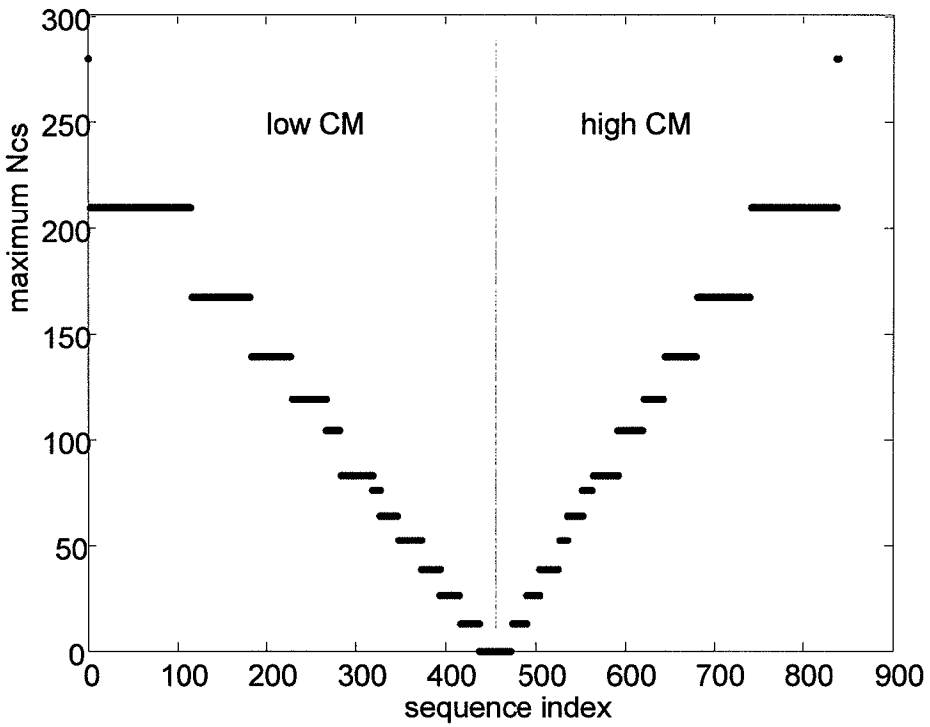
FIG. 1 shows a diagram illustrating segmenting of sequences according to a first ordering scheme of root sequences.

In a first ordering scheme shown in FIG. 1, sequences are first ordered according to increasing CM. The sequences are then divided into two sets with CM below or above a predetermined threshold, e.g. the CM of QPSK (Quadrature Phase Shift Keying) modulation. CM of QPSK is an appropriate point of comparison because it is the lowest order modulation used in E-UTRAN for user data transmission.

Finally the sequences in the low CM set are ordered according to a decreasing supported size of high mobility cell while the sequences in the high CM set are ordered according to an increasing supported size of high mobility cell. FIG. 1 shows the maximum supported cyclic shift increment Ncs as a function of the sequence index when the first ordering scheme is adopted. The maximum Ncs is proportional to the maximum cell size. As an example, Ncs has been quantized to 15 values 13, 26, 38, 52, 64, 76, 83, 104, 119, 139, 167, 209, 279, 419, 839. The sequence indexes whose maximum Ncs=0 can be allocated only in low mobility cells. The dashed line is a CM boundary dividing the sequences into low and high CM sets.

Figure 2:
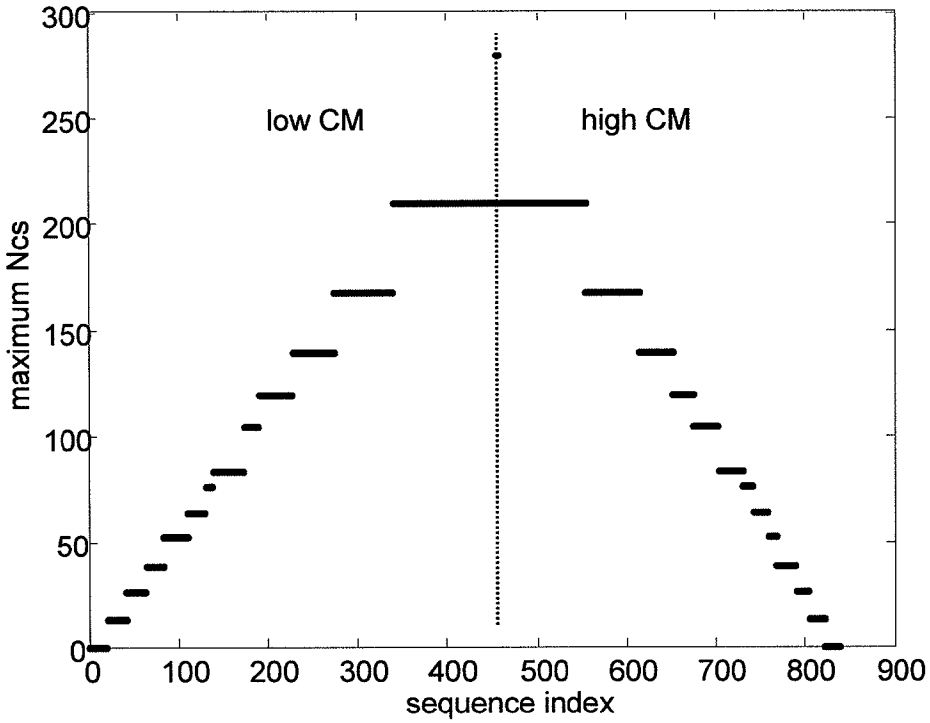
FIG. 2 shows a diagram illustrating segmenting of sequences according to a second ordering scheme of root sequences.

With a modification to the first ordering scheme, the ordering as shown in FIG. 2 is obtained. In order to obtain the second ordering scheme as shown in FIG. 2, the high and low CM sets are formed as described above, but the low CM set is ordered according to the increasing supported size of high mobility cell and the high CM set is ordered according to the decreasing supported size of high mobility cell.

FIG. 2 shows the maximum cyclic shift increment Ncs as a function of the root sequence index when the sequences are ordered with the second ordering scheme. The maximum Ncs is proportional to the cell size. The possible Ncs values have been quantized to 15 values. The sequence indexes whose maximum Ncs=0 can be allocated only in low mobility cells. The dashed line is a CM boundary dividing the sequences into low and high CM sets.

In case sequence allocations are needed for both the low and high mobility cells, the schemes of FIGS. 1 and 2 are equivalent only if the sequences of one cell are never obtained across the CM boundary. However, the sequence allocation over the CM boundary is desirable because that would bring flexibility and would in some cases also allow additional sets of the 64 sequences.

The schemes of FIGS. 1 and 2 are different if flexible allocation over the CM boundary is considered. In the scheme of FIG. 1 allocation over the CM boundary can be made flexibly only for the low mobility cells, while in the scheme of FIG. 2 the flexible allocation over the CM boundary is possible only for the sequences supporting large high mobility cells.

Figure 3:
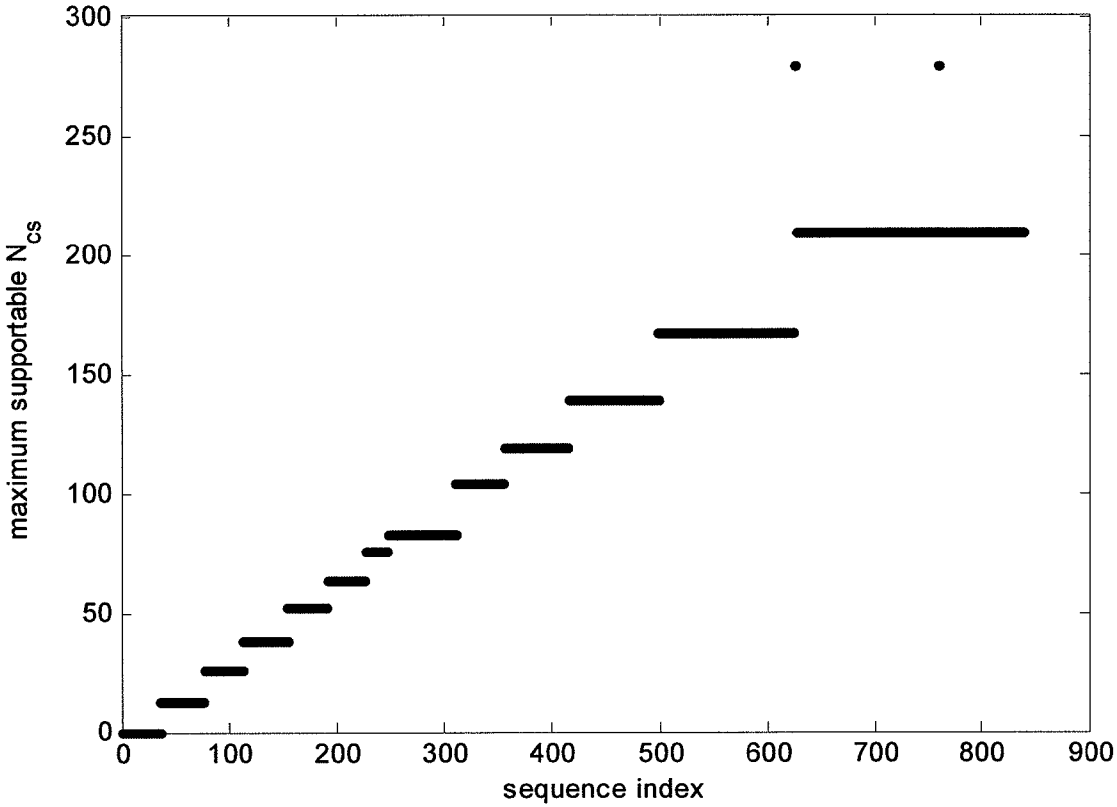
FIG. 3 shows a diagram illustrating segmenting of sequences according to a third ordering scheme of root sequences.
Figure 4:
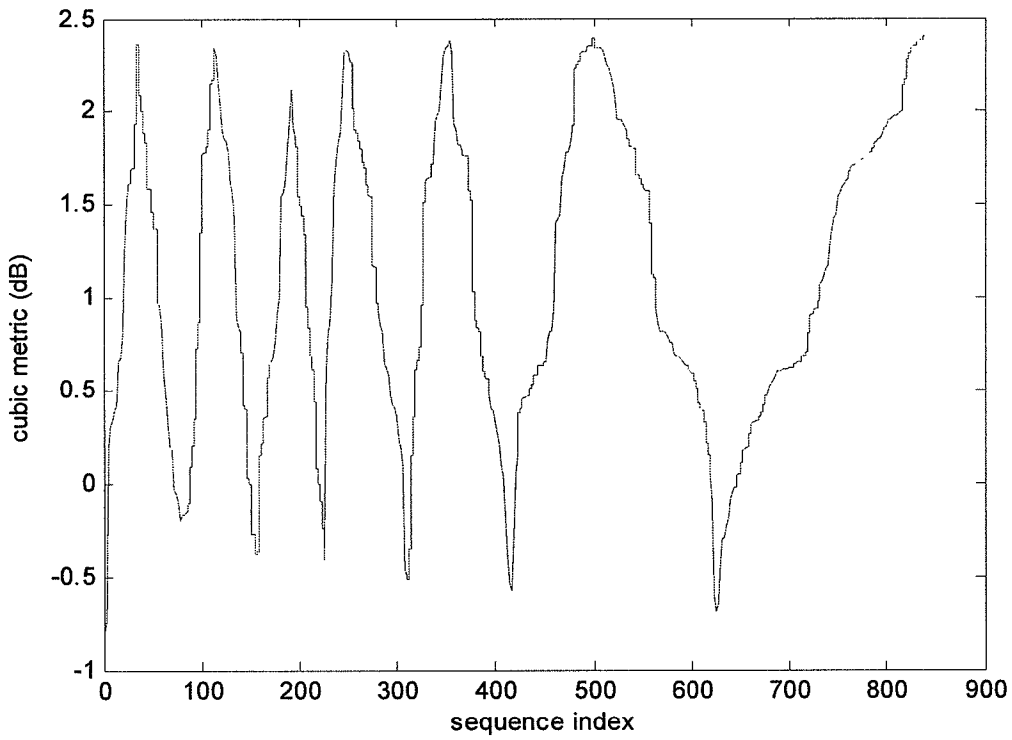
FIG. 4 shows a diagram illustrating CM of sequences in the third ordering scheme of root sequences.

According to a third ordering scheme, shown in FIG. 3, the sequences are first segmented according to the supported size of the high mobility cell. For instance, if the possible Ncs values were as assumed in the scheme of FIG. 1, a first set could include sequences that support cell sizes corresponding to Ncs=12 or smaller. The second set could comprise sequences supporting cell sizes up to Ncs=25 but not larger, and so on. Forming a segment corresponding to each specified Ncs value is just an example. For instance, in FIG. 3, the sequences whose maximum Ncs is 209 or 279 form one set. The sequences of each set are then ordered according to CM. A preferable way is to order every other set with CM decreasing and every other set with CM increasing. This leads to CM configuration as shown in FIG. 4.

First Embodiment

According to the first embodiment, sequence allocation is made cyclic. According to an E-UTRAN system, a UE forms a set of 64 sequences by starting from a broadcasted sequence u0 and using the consecutive sequences as needed. Sequence number one is considered to be consecutive to the sequence number 838.

Figure 5:
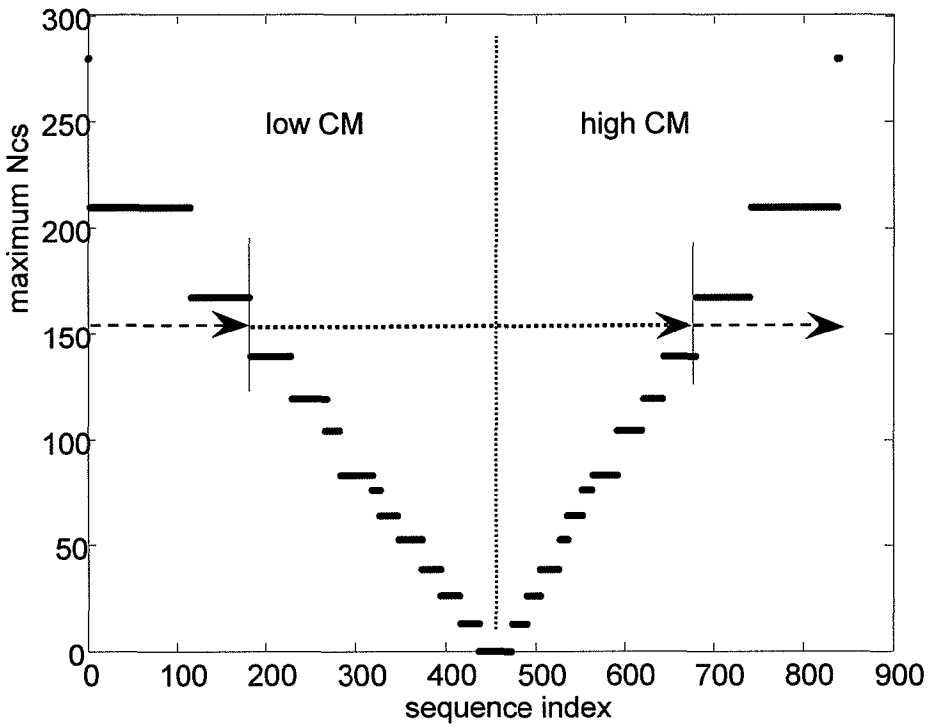
FIG. 5 shows a diagram illustrating segmenting of sequences according to an ordering scheme of root sequences according to an exemplary embodiment of the invention.

The first embodiment is described by referring to FIG. 5. The first ordering scheme as shown in FIG. 1 is adopted. A desired division of sequences between high and low mobility cells may be made e.g. as shown by the lines with the arrow heads: Dashed lines mark the sequences that are reserved for allocation in the high mobility cells while sequences marked with a dotted line are reserved for low mobility cells. How large these reserved sequence sets should be, depends on the number of high mobility cells relative to the low mobility cells and the cell size. Let us also assume that Ncs is below 167. Without the cyclic allocation, the sequences reserved for high mobility cells would form two disconnected sets and the root sequences allocated for one high mobility cell would be collected either from the low CM group or from the high CM group. Defining cyclic allocation joins all the sequences that are reserved for high mobility cells: for instance u0=838 could be allocated to a high mobility cell because the 64 sequences would then be collected from the root sequences 838, 1, 2, . . . . Without cyclic allocation, the sequence number 838 and, depending on Ncs, some other sequences with large index would not do for u0. In summary, according to the first embodiment the two sequence sets marked with the dashed lines are joined according to the cyclic allocation, for allocations over the CM boundary.

The cyclic allocation is useful also if sequence ordering scheme of FIG. 2 is in use because u0 value 838 and values close to that are not be possible except in very small cells where the 64 sequences can be collected from a single or a few root sequences.

Thus, with the first embodiment allocation of the sequences across the CM boundary is possible both for the sequences supporting large high mobility cells and the sequences that can be used only in low mobility cells.

The first embodiment simplifies the sequence allocation by allowing the root sequences number 838 and 1 to be allocated in the same cell. This flexibility may in some cases lead to an additional set of 64 sequences if the sequences are ordered as in the first or second ordering schemes shown in FIGS. 1 and 2.

The first embodiment does not complicate implementation of UE or base station in any way. The first embodiment actually simplifies implementation of the UE because it removes the error case that UE would not have 64 sequences after including all the cyclic shifts of the sequence number 838.

Figure 6:
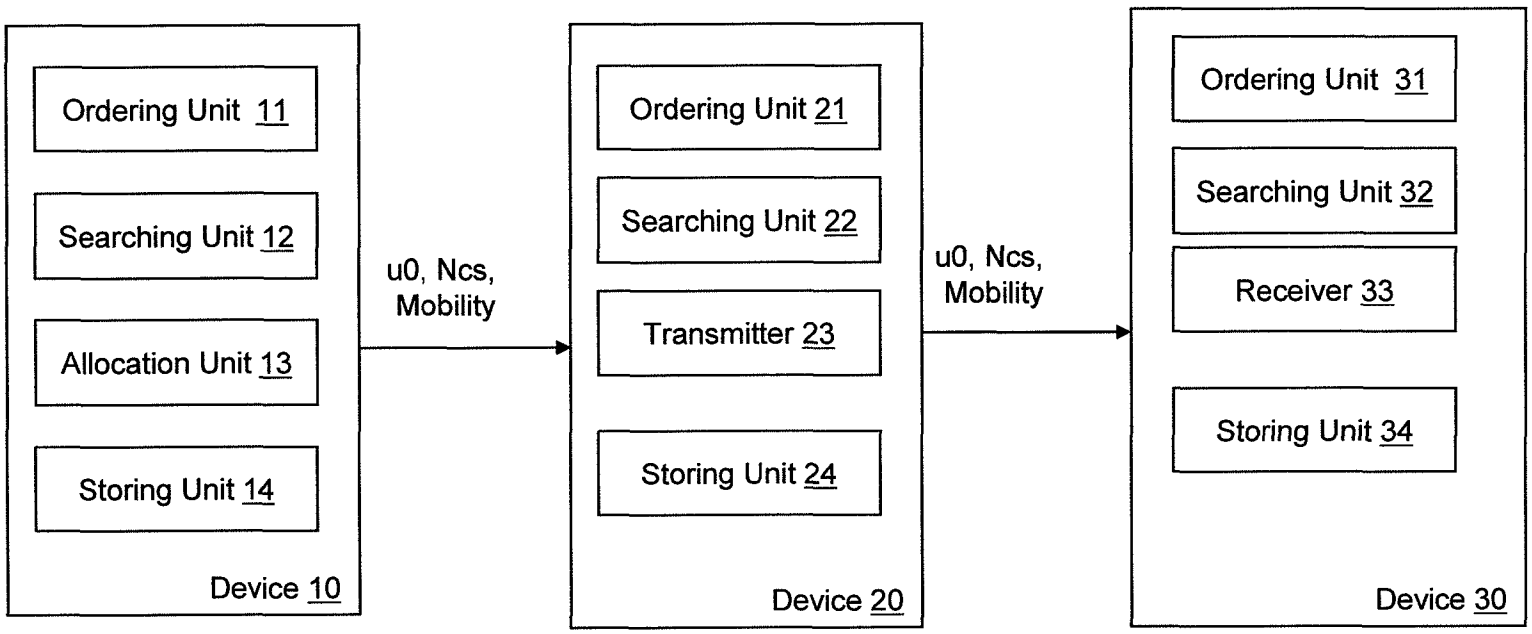
FIG. 6 shows a schematic block diagram illustrating a structure of devices according to an exemplary embodiment of the invention.

FIG. 6 shows a schematic block diagram illustrating a network controlling device 10, a device 20 which may act as base station and a device 30 which may act as user equipment according to the first embodiment.

Each of the devices 10, 20, 30 comprises a searching unit 12, 22, 32 which searches specific sequences based on a root sequence index u0 indicating a root sequence of ordered sequences, a cyclic shift increment of the root sequence Ncs and a mobility parameter "Mobility" from the ordered sequences.

The ordered sequences may be generated by an ordering unit 11, 21, 31 which may be provided in each of the devices 10, 20, 30. The ordering unit 11, 21, 31 may generate the ordered sequences after every boot up of the device 10, 20, 30. Alternatively, the ordering unit can be replaced by a permanent memory (storage unit) 14, 24, 34 in which the sequence order needs to be loaded only once or during possible software updates.

According to the first embodiment, the ordered sequences are obtained by dividing sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.

The cubic metric of each of the first sequences may be below the predetermined threshold and the cubic metric of each of the second sequences may be above the predetermined threshold. The ordering unit 11 may order the first sequences in accordance with the supported size of the high mobility cell decreasing and the second sequences in accordance with the supported size of the high mobility cell increasing as shown in FIG. 1 or vice versa as shown in FIG. 2.

The specific sequences searched by the searching unit 12, 22, 32 may comprise a set of root sequences and cyclic shifts thereof. The searching unit 12, 22, 32 starts the search of suitable root sequences from a sequence indicated by the root sequence index u0, including consecutive root sequences if needed, interpreting the order of the root sequences, i.e. the root sequence order, cyclic.

The device 10 may further comprise an allocation unit 13 which decides the root sequence index, the cyclic shift increment and the mobility parameter based on a required supported size of a cell in a communications network and a required cubic metric. The mobility parameter may be a binary parameter, wherein Mobility=0 means low mobility cell, and Mobility=1 means high mobility cell.

The transmission of information between the devices 10, 20, 30 is minimized if only the indication of a root sequence (root sequence index) u0, a cyclic shift increment Ncs and a mobility parameter are sent from device 10 to device 20 and further to device 30. The connection between device 20 and 30 is an air-interface, and device 20 includes a transmitter 23 that transmits u0, Ncs and the mobility parameter as a part of the System Information. A receiver 33 of device 30 receives u0, Ncs and the mobility parameter.

It is to be noted that the devices shown in FIG. 6 may have further functionality for working e.g. as network controlling device, base station and user equipment. Here the functions of the devices relevant for understanding the principles of the invention are described using functional blocks as shown in FIG. 6. The arrangement of the functional blocks of the devices is not construed to limit the invention, and the functions may be performed by one block or further split into sub-blocks.

Second Embodiment

Figure 7:
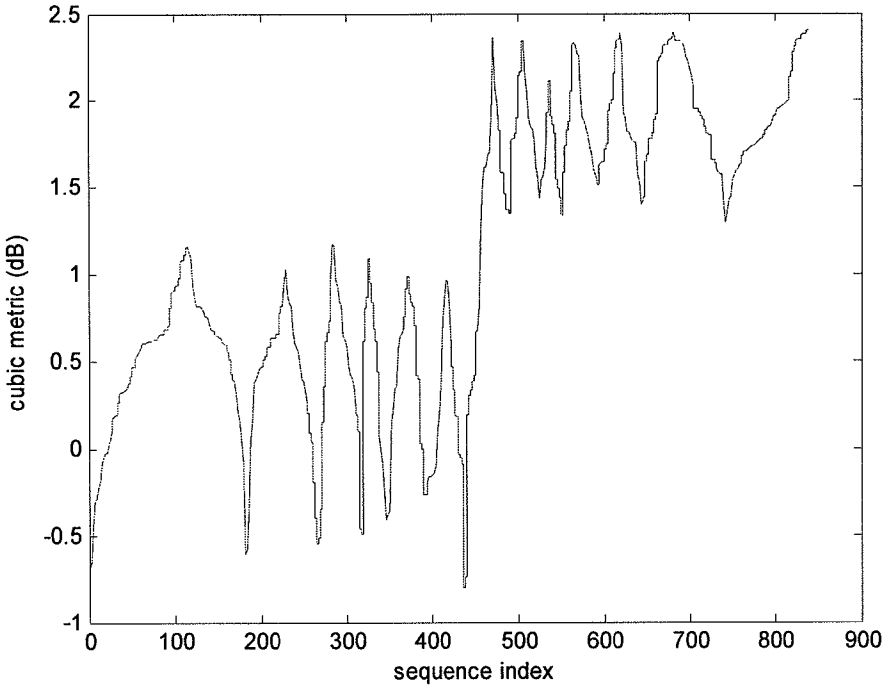
FIG. 7 shows a diagram illustrating CM of sequences in an ordering scheme according to an exemplary embodiment of the invention.

The second embodiment proposes a sequence ordering scheme that combines the first and third ordering schemes or the second and third ordering schemes. First the low and high CM sets are formed as shown in FIG. 1 or 2. Then the third ordering scheme is applied separately to the low and high CM sets or at least to the high CM set: Subsets are formed according to the supported cell size and the sequences inside each subset are ordered according to the CM. The resulting CM configuration is shown in FIG. 7 for the case that the first and the third ordering schemes are combined and subsets are formed for both low and high CM sets.

The second embodiment combines benefits of the first and third ordering schemes. CM defines the power back-off that UE has to apply in order to maintain low enough interference level on the adjacent channels: if CM is large, the UE has to lower its mean transmission power. On the other hand, if CM is low, the UE could transmit with higher mean power without exceeding the limits of the adjacent channel interference. However, the UE cannot exceed the 24 dBm maximum mean power which the UE should support when transmitting a QPSK signal. In other words, even if the CM of a sequence is below the CM of QPSK, the UE will not be able to transmit it with a power larger than 24 dBm. The sequences with CM less than CM of QPSK can then be freely ordered according to the cell size criterion as done in the first ordering scheme because all these sequences can be transmitted with the same maximum power. However, in the first ordering scheme also the sequences whose CM is larger than CM of QPSK are ordered only according to the cell size criterion. The differences in CM cannot then be fully utilized in this group because the consecutive sequences can have quite different CM values. If this group is ordered using the third ordering scheme, the consecutive sequences inside a subset have roughly the same CM, i.e. they can be transmitted with nearly the same maximum mean power (the same power back-off is needed). A disadvantage of the third ordering scheme is that the subsets are dividing the sequences with low CM into disjoint sets which is not optimal for sequence allocation. Treating the low CM sequences separately minimizes the effect of this disadvantage. As mentioned above, no coverage gain can be obtained even if the third ordering scheme was applied to the low CM set. However, a very minor possibility for UE's battery power saving might justify ordering also the low CM set with the third ordering scheme. If CM is below the CM of QPSK, UE can at least in principle tune its power amplifier more nonlinear, which would mean saving battery power.

Referring to FIG. 6, the ordering unit 11, 21, 31 of device 10, 20, 30 divides sequences of predetermined length and number into a first set comprising first sequences and a second set comprising second sequences in accordance with a cubic metric of each of the sequences below or above a predetermined threshold, orders the first sequences in accordance with a supported size of a high mobility cell supported by each of the first sequences, divides the second sequences into subsets in accordance with the supported size of the high mobility cell supported by each of the second sequences and orders the second sequences inside each of the subsets in accordance with the cubic metric of each of the second sequences, thereby obtaining ordered sequences. In an alternative scheme, also the first sequences are divided into subsets in accordance with the supported size of the high mobility cell supported by each of the first sequences and the sequences inside a subset are ordered according to CM.

The cubic metric of each of the first sequences may be below the predetermined threshold and the cubic metric of each of the second sequences may be above the predetermined threshold. The ordering unit 11, 21, 31 may order the first sequences in accordance with the supported size of the high mobility cell decreasing.

The searching unit 12, 22 and 32 searches in the thus ordered sequences. The ordering unit 11, 21, 31 may generate the ordered sequences after every boot up of the device 10, 20, 30. Alternatively, the ordering unit can be replaced by the permanent memory (storage unit) 14, 24, 34 in which the sequence order needs to be loaded only once or during possible software updates.

The specific sequences searched by the searching unit 12, 22, 32 may comprise a set of root sequences and cyclic shifts thereof. The searching unit 12, 22, 32 starts the search of suitable root sequences from a sequence indicated by the root sequence index u0, including consecutive root sequences if needed.

The second embodiment does not add complexity of devices 10, 20, 30 compared with the first to third ordering schemes. If sequences are ordered according to the cell size criterion, an implementation is to store the sequence order in the permanent memory of the UE. Then all the ordering schemes have equal complexity.

It is to be understood that CM is just an example of a property quantifying the need of the power back-off. The invention is applicable as such if any other measure, like peak-to-average power ratio, is used instead of CM to relate a power back-off value to a root sequence.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A device comprising:

*a receiver configured to receive information regarding one or more of a root sequence index or a cyclic shift increment; and* a searching unit configured to search a set of specific sequences, comprising a set of root sequences and cyclic shifts thereof, wherein the searching unit is configured to start from [a] *the* root sequence index indicating a root sequence of ordered root sequences *between a first root sequence of the ordered root sequences and a last root sequence of the ordered root sequences*, include available cyclic shifts of the root sequence, and continue with a next root sequence if necessary for filling the set, [interpreting] *wherein the searching unit is configured to interpret* the ordered root sequences in a cyclic manner,

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

[2. The device of claim 1, wherein the ordered root sequences are obtained by ordering sequences of a predetermined length and number in accordance with cubic metric of each of the sequences and a size of a high mobility cell each of the sequences supports.]

[3. The device of claim 2, wherein the ordered root sequences are obtained by dividing the sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.]

[4. The device of claim 3, wherein the cubic metric of each of the first sequences is below the predetermined threshold and the cubic metric of each of the second sequences is above the predetermined threshold, and the first sequences are ordered in accordance with the supported size of the high mobility cell decreasing and the second sequences are ordered in accordance with the supported size of the high mobility cell increasing or vice versa.]

5. A method comprising:

*receiving information regarding one or more of a root sequence index or a cyclic shift increment; and* searching a set of specific sequences, comprising a set of root sequences and cyclic shifts thereof, wherein the searching comprises:

starting from a root sequence index indicating a root sequence of ordered root sequences *between a first root sequence of the ordered root sequences and a last root sequence of the ordered root sequences*, including available cyclic shifts of the root sequence; and continuing with a next root sequence if necessary for filling the set[.]*; and* interpreting the ordered root sequences in a cyclic manner[.]*, wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

[6. The method of claim 5, wherein the ordered root sequences are obtained by ordering sequences of a predetermined length and number in accordance with cubic metric of each of the sequences and a size of a high mobility cell each of the sequences supports.]

[7. The method of claim 6, wherein the ordered root sequences are obtained by dividing the sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.]

[8. The method of claim 7, wherein the cubic metric of each of the first sequences is below the predetermined threshold and the cubic metric of each of the second sequences is above the predetermined threshold, and the first sequences are ordered in accordance with the supported size of the high mobility cell decreasing and the second sequences are ordered in accordance with the supported size of the high mobility cell increasing or vice versa.]

9. A computer program product comprising a *non-transitory* computer-readable storage medium including a program for a processing device, comprising software code portions for performing the [steps] *method* of claim 5 when the program is run on the processing device.

10. The computer program product according to claim 9, wherein the program is directly loadable into [an internal memory] *the non-transitory computer-readable storage medium* of the processing device.

*11. The device of claim 1, wherein, by interpretation of the ordered root sequences in a cyclic manner, the first sequence of the ordered root sequences is considered to be consecutive to the last sequence of the ordered root sequences.*

*12. The device of claim 1, wherein the first root sequence of the ordered root sequences is 1 and the last root sequence of the ordered root sequences is 838.*

*13. The device of claim 1, wherein the root sequences are Zadoff-Chu sequences.*

*14. The device of claim 1, wherein the subsets are formed according to maximum supported cyclic shift increments of the sequences quantized to a predetermined set of values.*

*15. The device of claim 1, wherein the predetermined threshold is the cubic metric of Quadrature Phase Shift Keying modulation.*

*16. The device of claim 1, wherein the receiver is further configured to receive a mobility parameter indicating whether the ordering uses a sequence restriction scheme, wherein one or more restrictions of the sequence restriction scheme define the maximum supportable size of a high mobility cell for each root sequence.*

*17. The device of claim 1, further comprising:*

*a transmitter configured to use a sequence in the set of specific sequences for transmission of a preamble in a mobile communication system.*

*18. The device of claim 17, wherein the mobile communication system is an evolved Universal Mobile Telecommunications System (UMTS) terrestrial radio access network.*

*19. The device of claim 1, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*20. The device of claim 1, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*21. The method of claim 5, wherein, by interpretation of the ordered root sequences in a cyclic manner, the first sequence of the ordered root sequences is considered to be consecutive to the last sequence of the ordered root sequences.*

*22. The method of claim 5, wherein the first root sequence of the ordered root sequences is 1 and the last root sequence of the ordered root sequences is 838.*

*23. The method of claim 5, wherein the root sequences are Zadoff-Chu sequences.*

*24. The method of claim 5, wherein the subsets are formed according to maximum supported cyclic shift increments of the sequences quantized to a predetermined set of values.*

*25. The method of claim 5, wherein the predetermined threshold is the cubic metric of Quadrature Phase Shift Keying modulation.*

*26. The method of claim 5, further comprising:*

*receiving a mobility parameter indicating whether the ordering uses a sequence restriction scheme, wherein one or more restrictions of the sequence restriction scheme define the maximum supportable size of a high mobility cell for each root sequence.*

*27. The method of claim 5, further comprising:*

*using a sequence in the set of specific sequences for transmission of a preamble in a mobile communication system.*

*28. The method of claim 27, wherein the mobile communication system is an evolved Universal Mobile Telecommunications System (UMTS) terrestrial radio access network.*

*29. The method of claim 5, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*30. The method of claim 5, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*31. A device comprising:*

*a transmitter configured to transmit information regarding one or more of a root sequence index or a cyclic shift increment; and*

*a searching unit configured to search a set of specific sequences, comprising a set of root sequences and cyclic shifts thereof, wherein the searching unit is configured to start from a root sequence index indicating a root sequence of ordered root sequences between a first root sequence of the ordered root sequences and a last root sequence of the ordered root sequences, include available cyclic shifts of the root sequence, and continue with a next root sequence if necessary for filling the set, wherein the searching unit is configured to interpret the ordered root sequences in a cyclic manner,*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

*32. The device of claim 31, wherein, by interpretation of the ordered root sequences in a cyclic manner, the first sequence of the ordered root sequences is considered to be consecutive to the last sequence of the ordered root sequences.*

*33. The device of claim 31, wherein the first root sequence of the ordered root sequences is 1 and the last root sequence of the ordered root sequences is 838.*

*34. The device of claim 31, wherein the root sequences are Zadoff-Chu sequences.*

*35. The device of claim 31, wherein the subsets are formed according to maximum supported cyclic shift increments of the sequences quantized to a predetermined set of values.*

*36. The device of claim 31, wherein the predetermined threshold is the cubic metric of Quadrature Phase Shift Keying modulation.*

*37. The device of claim 31, further comprising:*

*a receiver configured to receive a preamble in a mobile communication system, wherein the preamble is based on a sequence in the set of specific sequences.*

*38. The device of claim 37, wherein the mobile communication system is an evolved Universal Mobile Telecommunications System (UMTS) terrestrial radio access network.*

*39. The device of claim 31, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*40. The device of claim 31, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*41. A method comprising:*

*transmitting information regarding one or more of a root sequence index or a cyclic shift increment; and*

*searching a set of specific sequences, comprising a set of root sequences and cyclic shifts thereof, wherein the searching comprises:*

*starting from a root sequence index indicating a root sequence of ordered root sequences between a first root sequence of the ordered root sequences and a last root sequence of the ordered root sequences,*

*including available cyclic shifts of the root sequence; and*

*continuing with a next root sequence if necessary for filling the set; and*

*interpreting the ordered root sequences in a cyclic manner, wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

*42. The method of claim 41, wherein, by interpretation of the ordered root sequences in a cyclic manner, the first sequence of the ordered root sequences is considered to be consecutive to the last sequence of the ordered root sequences.*

*43. The method of claim 41, wherein the first root sequence of the ordered root sequences is 1 and the last root sequence of the ordered root sequences is 838.*

*44. The method of claim 41, wherein the root sequences are Zadoff-Chu sequences.*

*45. The method of claim 41, wherein the subsets are formed according to maximum supported cyclic shift increments of the sequences quantized to a predetermined set of values.*

*46. The method of claim 41, wherein the predetermined threshold is the cubic metric of Quadrature Phase Shift Keying modulation.*

*47. The method of claim 41, further comprising:*

*receiving a preamble in a mobile communication system, wherein the preamble is based on a sequence in the set of specific sequences.*

*48. The method of claim 47, wherein the mobile communication system is an evolved Universal Mobile Telecommunications System (UMTS) terrestrial radio access network.*

*49. The method of claim 41, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*50. The method of claim 41, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*51. A computer program product comprising a non-transitory computer-readable storage medium including a program for a processing device, comprising software code portions for performing the method of claim 41 when the program is run on the processing device.*

*52. The computer program product according to claim 51, wherein the program is directly loadable into the non-transitory computer-readable storage medium of the processing device.*

*53. A device comprising:*

*a processor; and*

*a computer-readable storage medium storing instructions thereon that, when executed by the processor, cause the device to perform at least:*

*searching a set of specific sequences, comprising a set of root sequences and cyclic shifts thereof, wherein said searching comprises:*

*starting from a root sequence index indicating a root sequence of ordered root sequences between a first root sequence of the ordered root sequences and a last root sequence of the ordered root sequences, including available cyclic shifts of the root sequence, and*

*continuing with a next root sequence if necessary for filling the set; and*

*interpreting the ordered root sequences in a cyclic manner;*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric,*

*wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

*54. The device of claim 53, wherein, by interpretation of the ordered root sequences in a cyclic manner, the first sequence of the ordered root sequences is considered to be consecutive to the last sequence of the ordered root sequences.*

*55. The device of claim 53, wherein the first root sequence of the ordered root sequences is 1 and the last root sequence of the ordered root sequences is 838.*

*56. The device of claim 53, wherein the root sequences are Zadoff-Chu sequences.*

*57. The device of claim 53, wherein the subsets are formed according to maximum supported cyclic shift increments of the sequences quantized to a predetermined set of values.*

*58. The device of claim 53, wherein the predetermined threshold is the cubic metric of Quadrature Phase Shift Keying modulation.*

*59. The device of claim 53, wherein the instructions stored on the computer-readable storage medium, when executed by the processor, further cause the device to perform at least:*

*receiving a mobility parameter indicating whether the ordering uses a sequence restriction scheme, wherein one or more restrictions of the sequence restriction scheme define the maximum supportable size of a high mobility cell for each root sequence.*

*60. The device of claim 53, wherein the instructions stored on the computer-readable storage medium, when executed by the processor, further cause the device to perform at least:*

*using a sequence in the set of specific sequences for transmission of a preamble in a mobile communication system.*

*61. The device of claim 60, wherein the mobile communication system is an evolved Universal Mobile Telecommunications System (UMTS) terrestrial radio access network.*

*62. The device of claim 53, wherein the instructions stored on the computer-readable storage medium, when executed by the processor, further cause the device to perform at least:*

*transmitting a mobility parameter indicating whether the ordering uses a sequence restriction scheme, wherein one or more restrictions of the sequence restriction scheme define the maximum supportable size of a high mobility cell for each root sequence.*

*63. The device of claim 53, wherein the instructions stored on the computer-readable storage medium, when executed by the processor, further cause the device to perform at least:*

*receiving a preamble in a mobile communication system, wherein the preamble is based on a sequence in the set of specific sequences.*

*64. The device of claim 63, wherein the mobile communication system is an evolved Universal Mobile Telecommunications System (UMTS) terrestrial radio access network.*

*65. The device of claim 53, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*66. The device of claim 53, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*67. A method comprising:*

*searching a set of specific sequences, comprising a set of root sequences and cyclic shifts thereof, wherein said searching comprises:*

*starting from a root sequence index indicating a root sequence of ordered root sequences between a first root sequence of the ordered root sequences and a last root sequence of the ordered root sequences,*

*including available cyclic shifts of the root sequence, and*

*continuing with a next root sequence if necessary for filling the set; and*

*interpreting the ordered root sequences in a cyclic manner;*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein sequences of adjacent subsets of the two or more subsets in the first set are ordered with alternating decreasing and increasing cubic metric values, and wherein sequences of adjacent subsets of the two or more subsets in the second set are ordered with alternating decreasing and increasing cubic metric values.*

*68. The method of claim 67, wherein, by interpretation of the ordered root sequences in a cyclic manner, the first sequence of the ordered root sequences is considered to be consecutive to the last sequence of the ordered root sequences.*

*69. The method of claim 67, wherein the first root sequence of the ordered root sequences is 1 and the last root sequence of the ordered root sequences is 838.*

*70. The method of claim 67, wherein the root sequences are Zadoff-Chu sequences.*

*71. The method of claim 67, wherein the subsets are formed according to maximum supported cyclic shift increments of the sequences quantized to a predetermined set of values.*

*72. The method of claim 67, wherein the predetermined threshold is the cubic metric of Quadrature Phase Shift Keying modulation.*

*73. The method of claim 67, further comprising:*

*receiving a mobility parameter indicating whether the ordering uses a sequence restriction scheme, wherein one or more restrictions of the sequence restriction scheme define the maximum supportable size of a high mobility cell for each root sequence.*

*74. The method of claim 67, further comprising:*

*using a sequence in the set of specific sequences for transmission of a preamble in a mobile communication system.*

*75. The method of claim 74, wherein the mobile communication system is an evolved Universal Mobile Telecommunications System (UMTS) terrestrial radio access network.*

*76. The method of claim 67, further comprising:*

*transmitting a mobility parameter indicating whether the ordering uses a sequence restriction scheme, wherein one or more restrictions of the sequence restriction scheme define the maximum supportable size of a high mobility cell for each root sequence.*

*77. The method of claim 67, further comprising:*

*receiving a preamble in a mobile communication system, wherein the preamble is based on a sequence in the set of specific sequences.*

*78. The method of claim 77, wherein the mobile communication system is an evolved Universal Mobile Telecommunications System (UMTS) terrestrial radio access network.*

*79. The method of claim 67, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*80. The method of claim 67, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*81. A computer program product comprising a non-transitory computer-readable storage medium including a program for a processing device, comprising software code portions for performing the method of claim 67 when the program is run on the processing device.*

*82. The computer program product according to claim 81, wherein the program is directly loadable into the non-transitory computer-readable storage medium of the processing device.*

*83. A device comprising:*

*a receiver configured to receive information regarding one or more of a root sequence index or a cyclic shift increment; and*

*a searching unit configured to search a set of specific sequences, comprising a set of root sequences and cyclic shifts thereof, wherein the searching unit is configured to start from the root sequence index indicating a root sequence of ordered root sequences between a first root sequence of the ordered root sequences and a last root sequence of the ordered root sequences, include available cyclic shifts of the root sequence, and continue with a next root sequence if necessary for filling the set, wherein the searching unit is configured to interpret the ordered root sequences in a cyclic manner,*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets of the first set, and wherein a subset of the two or more subsets of the second set has a direction of ordering that is opposite that of adjacent subsets of the second set.*

*84. The device of claim 83, wherein, by interpretation of the ordered root sequences in a cyclic manner, the first sequence of the ordered root sequences is considered to be consecutive to the last sequence of the ordered root sequences.*

*85. The device of claim 83, wherein the first root sequence of the ordered root sequences is 1 and the last root sequence of the ordered root sequences is 838.*

*86. The device of claim 83, wherein the root sequences are Zadoff-Chu sequences.*

*87. The device of claim 83, wherein the subsets are formed according to maximum supported cyclic shift increments of the sequences quantized to a predetermined set of values.*

*88. The device of claim 83, wherein the predetermined threshold is the cubic metric of Quadrature Phase Shift Keying modulation.*

*89. The device of claim 83, wherein the receiver is further configured to receive a mobility parameter indicating whether the ordering uses a sequence restriction scheme, and wherein one or more restrictions of the sequence restriction scheme define the maximum supportable size of a high mobility cell for each root sequence.*

*90. The device of claim 83, further comprising:*

*a transmitter configured to use a sequence in the set of specific sequences for transmission of a preamble in a mobile communication system.*

*91. The device of claim 90, wherein the mobile communication system is an evolved Universal Mobile Telecommunications System (UMTS) terrestrial radio access network.*

*92. The device of claim 83, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*93. The device of claim 83, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*94. A method comprising:*

*receiving information regarding one or more of a root sequence index or a cyclic shift increment; and*

*searching a set of specific sequences, comprising a set of root sequences and cyclic shifts thereof, wherein the searching comprises:*

*starting from a root sequence index indicating a root sequence of ordered root sequences between a first root sequence of the ordered root sequences and a last root sequence of the ordered root sequences,*

*including available cyclic shifts of the root sequence; and*

*continuing with a next root sequence if necessary for filling the set; and*

*interpreting the ordered root sequences in a cyclic manner, wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets of the first set, and wherein a subset of the two or more subsets of the second set has a direction of ordering that is opposite that of adjacent subsets of the second set.*

*95. The method of claim 94, wherein, by interpretation of the ordered root sequences in a cyclic manner, the first sequence of the ordered root sequences is considered to be consecutive to the last sequence of the ordered root sequences.*

*96. The method of claim 94, wherein the first root sequence of the ordered root sequences is 1 and the last root sequence of the ordered root sequences is 838.*

*97. The method of claim 94, wherein the root sequences are Zadoff-Chu sequences.*

*98. The method of claim 94, wherein the subsets are formed according to maximum supported cyclic shift increments of the sequences quantized to a predetermined set of values.*

*99. The method of claim 94, wherein the predetermined threshold is the cubic metric of Quadrature Phase Shift Keying modulation.*

*100. The method of claim 94, further comprising:*

*receiving a mobility parameter indicating whether the ordering uses a sequence restriction scheme, wherein one or more restrictions of the sequence restriction scheme define the maximum supportable size of a high mobility cell for each root sequence.*

*101. The method of claim 94, further comprising:*

*using a sequence in the set of specific sequences for transmission of a preamble in a mobile communication system.*

*102. The method of claim 101, wherein the mobile communication system is an evolved Universal Mobile Telecommunications System (UMTS) terrestrial radio access network.*

*103. The method of claim 94, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*104. The method of claim 94, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*105. A computer program product comprising a non-transitory computer-readable storage medium including a program for a processing device, comprising software code portions for performing the method of claim 94 when the program is run on the processing device.*

*106. The computer program product according to claim 105, wherein the program is directly loadable into the non-transitory computer-readable storage medium of the processing device.*

*107. A device comprising:*

*a transmitter configured to transmit information regarding one or more of a root sequence index or a cyclic shift increment; and*

*a searching unit configured to search a set of specific sequences, comprising a set of root sequences and cyclic shifts thereof, wherein the searching unit is configured to start from the root sequence index indicating a root sequence of ordered root sequences between a first root sequence of the ordered root sequences and a last root sequence of the ordered root sequences, include available cyclic shifts of the root sequence, and continue with a next root sequence if necessary for filling the set, wherein the searching unit is configured to interpret the ordered root sequences in a cyclic manner,*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets of the first set, and wherein a subset of the two or more subsets of the second set has a direction of ordering that is opposite that of adjacent subsets of the second set.*

*108. The device of claim 107, wherein, by interpretation of the ordered root sequences in a cyclic manner, the first*

*sequence of the ordered root sequences is considered to be consecutive to the last sequence of the ordered root sequences.*

*109. The device of claim 107, wherein the first root sequence of the ordered root sequences is 1 and the last root sequence of the ordered root sequences is 838.*

*110. The device of claim 107, wherein the root sequences are Zadoff-Chu sequences.*

*111. The device of claim 107, wherein the subsets are formed according to maximum supported cyclic shift increments of the sequences quantized to a predetermined set of values.*

*112. The device of claim 107, wherein the predetermined threshold is the cubic metric of Quadrature Phase Shift Keying modulation.*

*113. The device of claim 107, further comprising:*

*a receiver configured to receive a preamble in a mobile communication system, wherein the preamble is based on a sequence in the set of specific sequences.*

*114. The device of claim 113, wherein the mobile communication system is an evolved Universal Mobile Telecommunications System (UMTS) terrestrial radio access network.*

*115. The device of claim 107, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*116. The device of claim 107, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*117. A method comprising:*

*transmitting information regarding one or more of a root sequence index or a cyclic shift increment; and*

*searching a set of specific sequences, comprising a set of root sequences and cyclic shifts thereof, wherein the searching comprises:*

*starting from a root sequence index indicating a root sequence of ordered root sequences between a first root sequence of the ordered root sequences and a last root sequence of the ordered root sequences,*

*including available cyclic shifts of the root sequence; and*

*continuing with a next root sequence if necessary for filling the set; and*

*interpreting the ordered root sequences in a cyclic manner, wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets of the first set, and wherein a subset of the two or more subsets of the second set has a direction of ordering that is opposite that of adjacent subsets of the second set.*

*118. The method of claim 117, wherein, by interpretation of the ordered root sequences in a cyclic manner, the first sequence of the ordered root sequences is considered to be consecutive to the last sequence of the ordered root sequences.*

*119. The method of claim 117, wherein the first root sequence of the ordered root sequences is 1 and the last root sequence of the ordered root sequences is 838.*

*120. The method of claim 117, wherein the root sequences are Zadoff-Chu sequences.*

*121. The method of claim 117, wherein the subsets are formed according to maximum supported cyclic shift increments of the sequences quantized to a predetermined set of values.*

*122. The method of claim 117, wherein the predetermined threshold is the cubic metric of Quadrature Phase Shift Keying modulation.*

*123. The method of claim 117, further comprising:*

*receiving a preamble in a mobile communication system, wherein the preamble is based on a sequence in the set of specific sequences.*

*124. The method of claim 123, wherein the mobile communication system is an evolved Universal Mobile Telecommunications System (UMTS) terrestrial radio access network.*

*125. The method of claim 117, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*126. The method of claim 117, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*127. A computer program product comprising a non-transitory computer-readable storage medium including a program for a processing device, comprising software code portions for performing the method of claim 117 when the program is run on the processing device.*

*128. The computer program product according to claim 127, wherein the program is directly loadable into the non-transitory computer-readable storage medium of the processing device.*

*129. A device comprising:*

*a processor; and*

*a computer-readable storage medium storing instructions thereon that, when executed by the processor, cause the device to perform at least:*

*searching a set of specific sequences, comprising a set of root sequences and cyclic shifts thereof, wherein said searching comprises:*

*starting from a root sequence index indicating a root sequence of ordered root sequences between a first root sequence of the ordered root sequences and a last root sequence of the ordered root sequences,*

*including available cyclic shifts of the root sequence, and*

*continuing with a next root sequence if necessary for filling the set; and*

*interpreting the ordered root sequences in a cyclic manner;*

*wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric,*

*wherein each subset has a direction of ordering that reflects either an increasing cubic metric direction or a decreasing cubic metric direction, wherein a subset of the two or more subsets of the first set has a direction of ordering that is opposite that of adjacent subsets of the first set, and wherein a subset of the two or more subsets of the second set has a direction of ordering that is opposite that of adjacent subsets of the second set.*

*130. The device of claim 129, wherein, by interpretation of the ordered root sequences in a cyclic manner, the first sequence of the ordered root sequences is considered to be consecutive to the last sequence of the ordered root sequences.*

*131. The device of claim 129, wherein the first root sequence of the ordered root sequences is 1 and the last root sequence of the ordered root sequences is 838.*

*132. The device of claim 129, wherein the root sequences are Zadoff-Chu sequences.*

*133. The device of claim 129, wherein the subsets are formed according to maximum supported cyclic shift increments of the sequences quantized to a predetermined set of values.*

*134. The device of claim 129, wherein the predetermined threshold is the cubic metric of Quadrature Phase Shift Keying modulation.*

*135. The device of claim 129, wherein the instructions stored on the computer-readable storage medium, when executed by the processor, further cause the device to perform at least:*

*receiving a mobility parameter indicating whether the ordering uses a sequence restriction scheme, wherein one or more restrictions of the sequence restriction scheme define the maximum supportable size of a high mobility cell for each root sequence.*

*136. The device of claim 129, wherein the instructions stored on the computer-readable storage medium, when executed by the processor, further cause the device to perform at least:*

*using a sequence in the set of specific sequences for transmission of a preamble in a mobile communication system.*

*137. The device of claim 136, wherein the mobile communication system is an evolved Universal Mobile Telecommunications System (UMTS) terrestrial radio access network.*

*138. The device of claim 129, wherein the instructions stored on the computer-readable storage medium, when executed by the processor, further cause the device to perform at least:*

*transmitting a mobility parameter indicating whether the ordering uses a sequence restriction scheme, wherein one or more restrictions of the sequence restriction scheme define the maximum supportable size of a high mobility cell for each root sequence.*

*139. The device of claim 129, wherein the instructions stored on the computer-readable storage medium, when executed by the processor, further cause the device to perform at least:*

*receiving a preamble in a mobile communication system, wherein the preamble is based on a sequence in the set of specific sequences.*

*140. The device of claim 139, wherein the mobile communication system is an evolved Universal Mobile Telecommunications System (UMTS) terrestrial radio access network.*

*141. The device of claim 129, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*142. The device of claim 129, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

*143. A computer program product comprising a non-transitory computer-readable storage medium including a program for a processing device, comprising software code portions for performing:*

*searching a set of specific sequences, comprising a set of root sequences and cyclic shifts thereof, wherein the searching comprises:*

*starting from a root sequence index indicating a root sequence of ordered root sequences between a first root sequence of the ordered root sequences and a last root sequence of the ordered root sequences,*

*including available cyclic shifts of the root sequence; and*

*continuing with a next root sequence if necessary for filling the set; and*

*interpreting the ordered root sequences in a cyclic manner, wherein the ordered root sequences are obtained by ordering sequences of a predetermined length and number in accordance with a cubic metric of each of*

*the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets, and wherein a subset of the two or more subsets of the second set has a direction of ordering that is opposite that of adjacent subsets.*

*144. A method comprising:*

*searching a set of specific sequences, comprising a set of root sequences and cyclic shifts thereof, wherein the searching comprises:*

*starting from a root sequence index indicating a root sequence of ordered root sequences between a first root sequence of the ordered root sequences and a last root sequence of the ordered root sequences,*

*including available cyclic shifts of the root sequence; and*

*continuing with a next root sequence if necessary for filling the set; and*

*interpreting the ordered root sequences in a cyclic manner, wherein the ordered root sequences are obtained by ordering sequences of a predetermined length and number in accordance with a cubic metric of each of the sequences and a size of a high mobility cell that each of the sequences supports, wherein the ordering comprises:*

*dividing the sequences into a first set for which the cubic metric is below a predetermined threshold and a second set for which the cubic metric is above the predetermined threshold,*

*forming two or more subsets of the sequences in the first set and two or more subsets of the sequences in the second set according to the supported cell sizes, wherein the subsets are arranged such that supported cell sizes of the sequences either increase between subsets of the first set and decrease between subsets of the second set or decrease between subsets of the first set and increase between subsets of the second set, and*

*ordering the sequences in each subset according to the cubic metric, wherein each subset has a direction of ordering that reflects either an increasing cubic metric direction or a decreasing cubic metric direction, wherein a subset of the two or more subsets of the first set has a direction of ordering that is opposite that of adjacent subsets, and wherein a subset of the two or more subsets of the second set has a direction of ordering that is opposite that of adjacent subsets.*

*145. The method of claim 144, wherein, by interpreting the ordered root sequences in a cyclic manner, the first sequence of the ordered root sequences is considered to be consecutive to the last sequence of the ordered root sequences.*

*146. The method of claim 144, wherein the first root sequence of the set of root sequences is 1 and the last root sequence of the set of root sequences is 838.*

*147. The method of claim 144, wherein the root sequences are Zadoff-Chu sequences.*

*148. The method of claim 144, wherein the subsets are formed according to maximum supported cyclic shift increments of the sequences quantized to a predetermined set of values.*

*149. The method of claim 144, wherein the predetermined threshold is the cubic metric of Quadrature Phase Shift Keying modulation.*

*150. The method of claim 144, further comprising:*

*receiving a mobility parameter indicating whether the ordering uses a sequence restriction scheme, wherein one or more restrictions of the sequence restriction scheme define the maximum supportable size of a high mobility cell for each root sequence.*

*151. The method of claim 144, further comprising:*

*using a sequence in the set of specific sequences for transmission of a preamble in a random access procedure of a mobile communication system.*

*152. The method of claim 151, wherein the mobile communication system is an evolved Universal Mobile Telecommunications System (UMTS) terrestrial radio access network.*

*153. The method of claim 144, further comprising:*

*transmitting a mobility parameter indicating whether the ordering uses a sequence restriction scheme, wherein one or more restrictions of the sequence restriction scheme define the maximum supportable size of a high mobility cell for each root sequence.*

*154. The method of claim 144, wherein a supported size of a high mobility cell supported by the first sequence of the ordered root sequences and a supported size of a high mobility cell supported by the last sequence of the ordered root sequences are similar such that, in an instance in which the next root sequence includes the first sequence of the ordered root sequences, the consecutive root sequences support a same size of a high mobility cell.*

*155. The method of claim 144, wherein a cubic metric of a last sequence of the ordered sequences in the first set has a cubic metric value which is highest in its subset, and a cubic metric of a first sequence of the ordered sequences in the second set has a cubic metric value which is lowest in its subset.*

* * * * *